US012401166B2

(12) United States Patent
Hibino et al.

(10) Patent No.: US 12,401,166 B2
(45) Date of Patent: Aug. 26, 2025

(54) CABLE CONNECTION STRUCTURE

(71) Applicant: SUMITOMO WIRING SYSTEMS, LTD., Mie (JP)

(72) Inventors: Takuma Hibino, Mie (JP); Harald Lutsch, Wolfsburg (DE)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 358 days.

(21) Appl. No.: 18/026,483

(22) PCT Filed: Sep. 9, 2021

(86) PCT No.: PCT/JP2021/033217
§ 371 (c)(1),
(2) Date: Mar. 15, 2023

(87) PCT Pub. No.: WO2022/070831
PCT Pub. Date: Apr. 7, 2022

(65) Prior Publication Data

US 2023/0344182 A1 Oct. 26, 2023

(30) Foreign Application Priority Data

Sep. 29, 2020 (JP) ................................ 2020-163669

(51) Int. Cl.
*H01R 13/00* (2006.01)
*H01R 13/52* (2006.01)
(Continued)

(52) U.S. Cl.
CPC ............ *H01R 31/08* (2013.01); *H01R 13/52* (2013.01); *H01R 13/6463* (2013.01)

(58) Field of Classification Search
CPC ........................... H01R 13/52; H01R 13/6463
See application file for complete search history.

(56) References Cited

U.S. PATENT DOCUMENTS

| | | | | |
|---|---|---|---|---|
| 6,394,842 | B1 | 5/2002 | Sakurai et al. | |
| 11,688,960 | B2 * | 6/2023 | Lloyd .................... | H01R 12/79 439/66 |

(Continued)

FOREIGN PATENT DOCUMENTS

| | | | |
|---|---|---|---|
| JP | S61-161985 | U1 | 10/1986 |
| JP | 2018-073822 | A | 5/2018 |
| JP | 2020-177791 | A | 10/2020 |

OTHER PUBLICATIONS

International Search Report issued on Nov. 9, 2021 for WO 2022/070831 A1 {4 pages).

*Primary Examiner* — Phuong Chi Thi Nguyen
(74) *Attorney, Agent, or Firm* — Venjuris, P.C.

(57) ABSTRACT

A communication cable connection structure is provided with a relay member for electrically connecting a first communication cable and a second communication cable. The relay member includes a signal pin for electrically connecting female terminals provided in the respective communication cables, a shield pin for electrically connecting shield members provided in the respective communication cables, and a tubular first housing for integrating the signal pin and the shield pin. The first housing includes a first hole portion into which a connector module of the first communication cable is fit, a second hole portion into which a connector module of the second communication cable is fit, and a partitioning portion for partitioning between the first and the second hole portions. The signal pin and the shield pin are held in the partitioning portion.

8 Claims, 10 Drawing Sheets

(51) Int. Cl.
*H01R 13/6463* (2011.01)
*H01R 31/08* (2006.01)

(56) References Cited

U.S. PATENT DOCUMENTS

| | | | |
|---|---|---|---|
| 2002/0111067 | A1 | 8/2002 | Sakurai et al. |
| 2019/0157809 | A1 | 5/2019 | Maesoba et al. |

* cited by examiner

CABLE CONNECTION STRUCTURE

CROSS REFERENCE TO RELATED APPLICATIONS

This application is a national phase of PCT application No. PCT/JP2021/033217, filed on 9 Sep. 2021, which claims priority from Japanese patent application No. 2020-163669, filed on 29 Sep. 2020, all of which are incorporated herein by reference.

TECHNICAL FIELD

The present disclosure relates to a cable connection structure.

BACKGROUND

Communication cables include those including a shield and those not including a shield. Under an environment in which much noise is generated, communication cables including a shield are used. In recent years, with the electrification of vehicles including passenger vehicles, communication cables including a shield have been used in vehicles.

For example, Patent Document 1 discloses a communication cable including a shield. This communication cable is provided with a shielded cable and a shield terminal mounted on an end part of the shielded cable. The shielded cable includes a core wire serving as a conductor and a braided wire serving as a shielding layer. The shield terminal includes a connector-shaped dielectric, an inner conductor arranged inside the dielectric and an outer conductor arranged outside the dielectric. The inner conductor is a terminal to be electrically connected to the core wire of the shielded cable. The outer conductor is a shield member to be electrically connected to the braided wire to shield electromagnetic waves.

A configuration of patent literature 1 is provided with a ground terminal for allowing a current flowing in the outer conductor to escape to ground. A part of the ground terminal is in contact with the outer conductor inside the dielectric, and another part of the ground terminal is in contact with a ground plate outside a housing.

PRIOR ART DOCUMENT

Patent Document

Patent Document 1: JP 2018-006183 A

SUMMARY OF THE INVENTION

The present disclosure is directed to a cable connection structure with a first communication cable, a second communication cable, and a relay member for electrically connecting the first and second communication cables, each of the first and second communication cables including a cable body and a connector module provided on an end part of the cable body, the cable body including a conductor, an insulating layer arranged on an outer periphery of the conductor, a shielding layer arranged on an outer periphery of the insulating layer and a sheath for covering an outer periphery of the shielding layer, the connector module including a female terminal to be electrically connected to the conductor, a connector member for accommodating the female terminal and a tubular shield member for covering an outer periphery of the connector member, the shielding layer exposed from the sheath at an end part of the cable body being electrically connected to the shield member, the relay member including a signal pin for electrically connecting the female terminal provided in the first communication cable and the female terminal provided in the second communication cable, a shield pin for electrically connecting the shield member provided in the first communication cable and the shield member provided in the second communication cable, and a tubular first housing for integrating the signal pin and the shield pin, the first housing including a first hole portion, the connector module provided in the first communication cable being fit into the first hole portion, a second hole portion, the connector module provided in the second communication cable being fit into the second hole portion, and a partitioning portion for partitioning between the first and the second hole portions, and the signal pin and the shield pin being held in the partitioning portion.

DETAILED DESCRIPTION TO EXECUTE THE INVENTION

Figure 1:
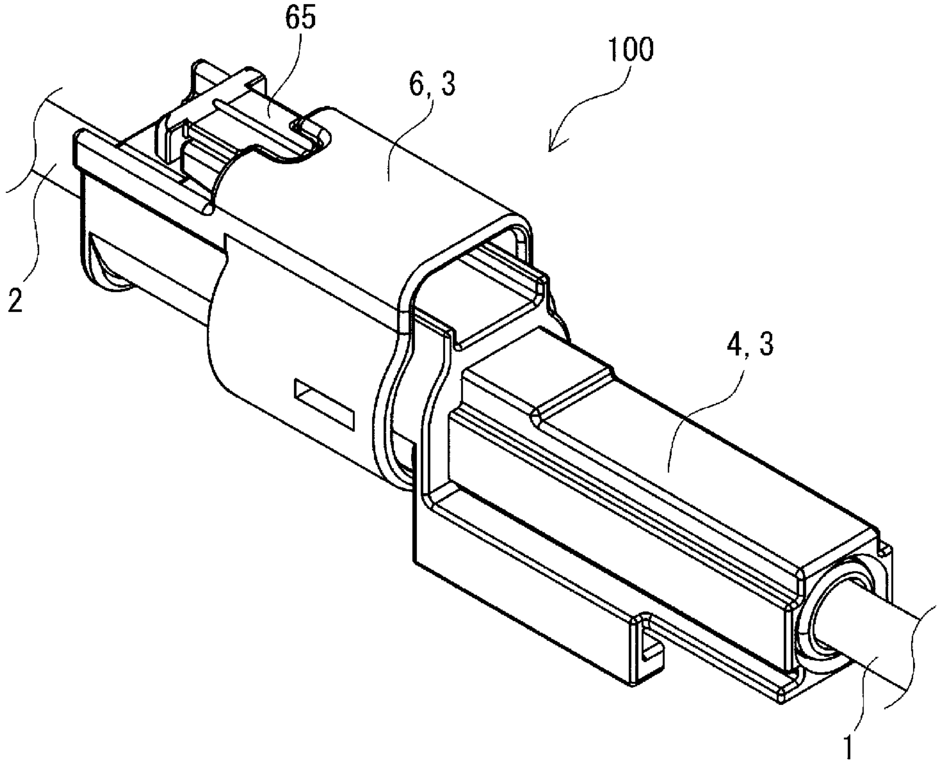
FIG. 1 is a perspective view of a cable connection structure of one embodiment.

Problems to be Solved by the Present Disclosure

In recent years, the number of communication cables arranged in a vehicle has tended to increase. To route a communication cable including a shield at each location in the vehicle, it is studied to connect two communication cables each including a shield. However, how to transmit a communication signal and how a current flowing in a shield layer is handled in a cable connection structure have not been sufficiently studied.

Accordingly, one object of the present disclosure is to provide a cable connection structure capable of easily constructing a transmission path of a communication signal between two communication cables each including a shield and a ground circuit for allowing a current flowing in a shield layer to escape to ground.

Advantageous Effects of the Present Disclosure

According to the cable connection structure of the present disclosure, a transmission path of a communication signal between two communication cables each including a shield and a ground circuit for allowing a current flowing in a shield layer to escape to ground can be easily constructed.

DESCRIPTION OF EMBODIMENTS OF PRESENT DISCLOSURE

First, embodiments of the present disclosure are listed and described.

(1) A cable connection structure according to an embodiment is provided with a first communication cable, a second communication cable, and a relay member for electrically connecting the first and second communication cables, each of the first and second communication cables including a cable body and a connector module provided on an end part of the cable body, the cable body including a conductor, an insulating layer arranged on an outer periphery of the conductor, a shielding layer arranged on an outer periphery of the insulating layer and a sheath for covering an outer periphery of the shielding layer, the connector module including a female terminal to be electrically connected to the conductor, a connector member for accommodating the female terminal and a tubular shield member for covering an outer periphery of the connector member, the shielding layer exposed from the sheath at an end part of the cable body being electrically connected to the shield member, the relay member including a signal pin for electrically connecting the female terminal provided in the first communication cable and the female terminal provided in the second communication cable, a shield pin for electrically connecting the shield member provided in the first communication cable and the shield member provided in the second communication cable, and a tubular first housing for integrating the signal pin and the shield pin, the first housing including a first hole portion, the connector module provided in the first communication cable being fit into the first hole portion, a second hole portion, the connector module provided in the second communication cable being fit into the second hole portion, and a partitioning portion for partitioning between the first and the second hole portions, and the signal pin and the shield pin being held in the partitioning portion.

In the cable connection structure according to the embodiment, the female terminal of the first communication cable and that of the second communication cable are connected via the signal pin of the relay member. Further, in the cable connection structure according to the embodiment, the shield member of the first communication cable and that of the second communication cable are connected via the shield pin of the relay member. Therefore, according to the cable connection structure of the present disclosure, a transmission path of a communication signal between the first and second communication cables and a ground circuit for currents flowing in the shielding layers are simultaneously secured only by inserting the first and second communication cables into the relay member.

In the cable connection structure according to the embodiment, the connector module of the first communication cable and that of the second communication cable can have the same configuration. That is, in the cable connection structure according to the embodiment, it is not necessary to use one connector module as a male module and the other connector module as a female module.

(2) As one aspect of the cable connection structure according to the embodiment, the shield member is a cast body having no hole open in a peripheral surface thereof and includes a tubular portion for individually accommodating the connector member.

The shield member formed of the cast body having no hole open in the peripheral surface is excellent in shielding performance. Further, the shield member formed of the cast body can be mounted on the connector member only by being fit on the connector module.

(3) As one aspect of the cable connection structure according to the embodiment, a gap is formed between an inner peripheral surface of the shield member and an outer peripheral surface of the connector member, and the shield pin is inserted into the gap and in contact with the inner peripheral surface of the shield member.

In the configuration of the above aspect (3), the female terminal and the signal pin are joined inside the connector member and the shield member and the shield pin are connected at the position of the gap between the connector member and the shield member. Thus, a connection error such as the connection of the signal pin to the shield member or the connection of the shield pin to the female terminal does not occur. Further, since the connector member is interposed between the signal pin and the shield pin, insulation between the both pins is ensured.

(4) As one aspect of the cable connection structure of the above aspect (3), the connector member includes a connector tube portion having an insertion hole, the female terminal being inserted into the insertion hole, and a guide portion protruding on an outer periphery of the connector tube portion, and the guide portion curves the shield pin inserted into the gap toward the shield member.

The shield pin is curved toward the shield member by the guide portion of the connector member. As a result, the contact of the shield pin and the shield member is easily ensured.

(5) As one aspect of the cable connection structure according to the embodiment, the cable body is a twisted pair cable, and the second communication cable is fit into the second hole portion in a state vertically inverted with respect to the first communication cable.

Even the first and second communication cables having polarities like twisted pair cables can be connected by the relay member.

(6) As one aspect of the cable connection structure according to the embodiment, each of the first and second communication cables includes a waterproof boot, and the waterproof boot is fit on an outer periphery of the sheath.

According to the configuration of the above aspect (6), water hardly adheres to a connected location of the first and second communication cables.

(7) As one aspect of the cable connection structure according to the embodiment, the relay member includes a second housing separate from the first housing, the second housing includes a tubular housing body, the connector module of the second communication cable being fit into the housing body, and an outer tube portion for covering an outer periphery of the housing body, the first housing is fit between the housing body and the outer tube portion, and the housing body is fit into the second hole portion of the first housing.

According to the configuration of the above aspect (7), the connector module of the second communication cable is fit and held in the housing body of the second housing, and the tip of the first housing is fit and held between the housing body and the outer tube portion of the second housing. Thus, the first and second communication cables are hardly separated. Further, in the configuration of the above aspect (7), the connected location of the first and second communication cables is doubly covered by the first and second housings. Therefore, the waterproofness of the connected location of the first and second communication cables is improved.

(8) As one aspect of the cable connection structure according to the embodiment, a distance between an end surface of the shield member provided in the first communication cable and an end surface of the shield member provided in the second communication cable is 1 mm or more and 5 mm or less.

A lower limit value of the distance is a thickness of the partitioning portion partitioning between the first and second hole portions. If the partitioning portion is 1 mm or more, the partitioning portion can firmly hold the signal pin and the shield pin. Here, shielding is limited at a location of the above distance in the cable connection structure. However, if the distance is 5 mm or less, communication quality between the both communication cables is hardly reduced.

DETAILS DESCRIPTION OF EMBODIMENTS OF THE PRESENT DISCLOSURE

Hereinafter, a cable connection structure according to an embodiment of the present disclosure is described on the basis of the drawings. The same reference signs in figures denote the same components. Note that the present invention is not limited to these illustrations and is intended to be represented by claims and include all changes in the scope of claims and in the meaning and scope of equivalents.

Embodiment 1

<<Cable Connection Structure>>

Figure 2:
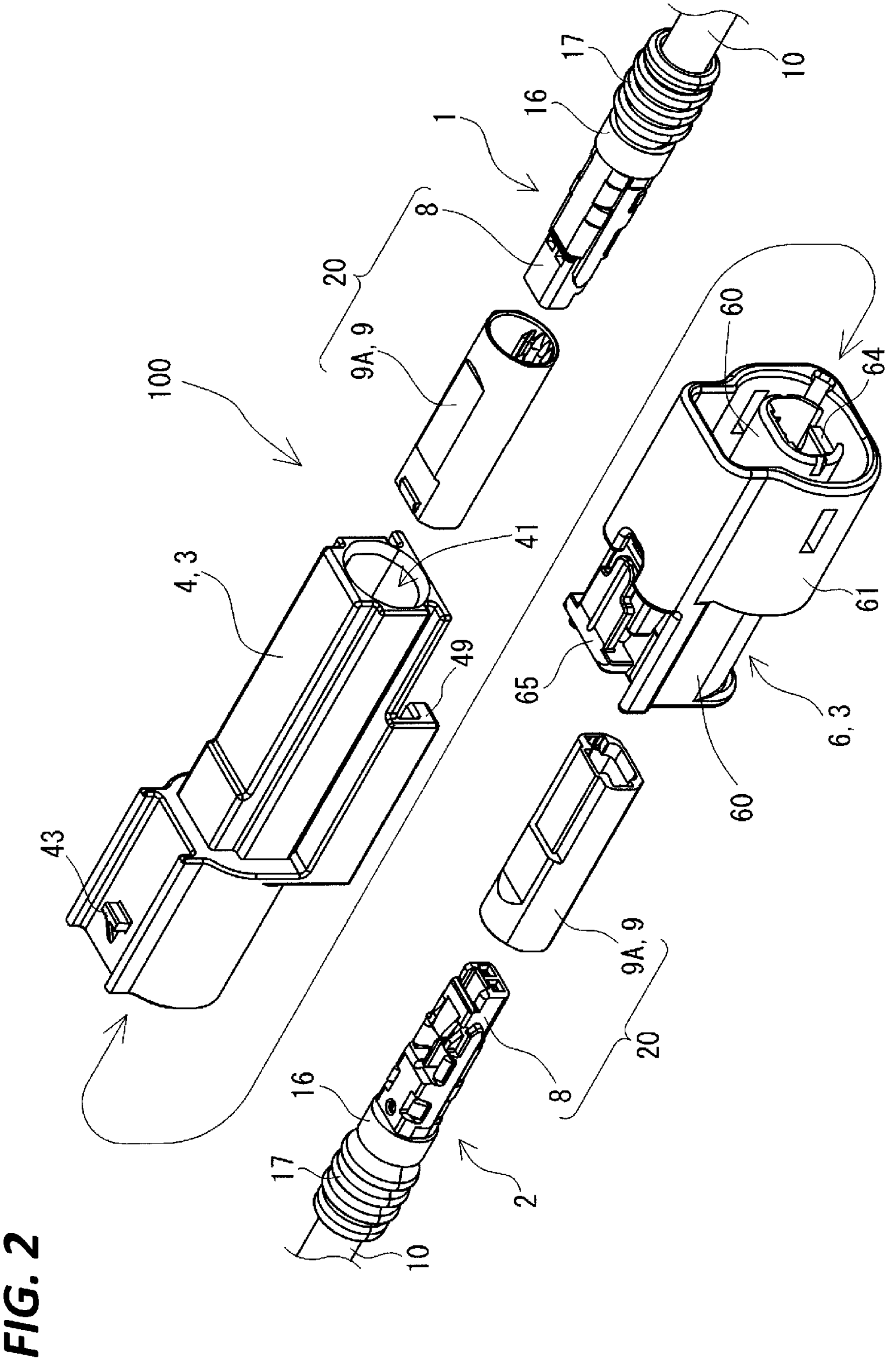
FIG. 2 is an exploded perspective view of the cable connection structure of the embodiment.
Figure 3:
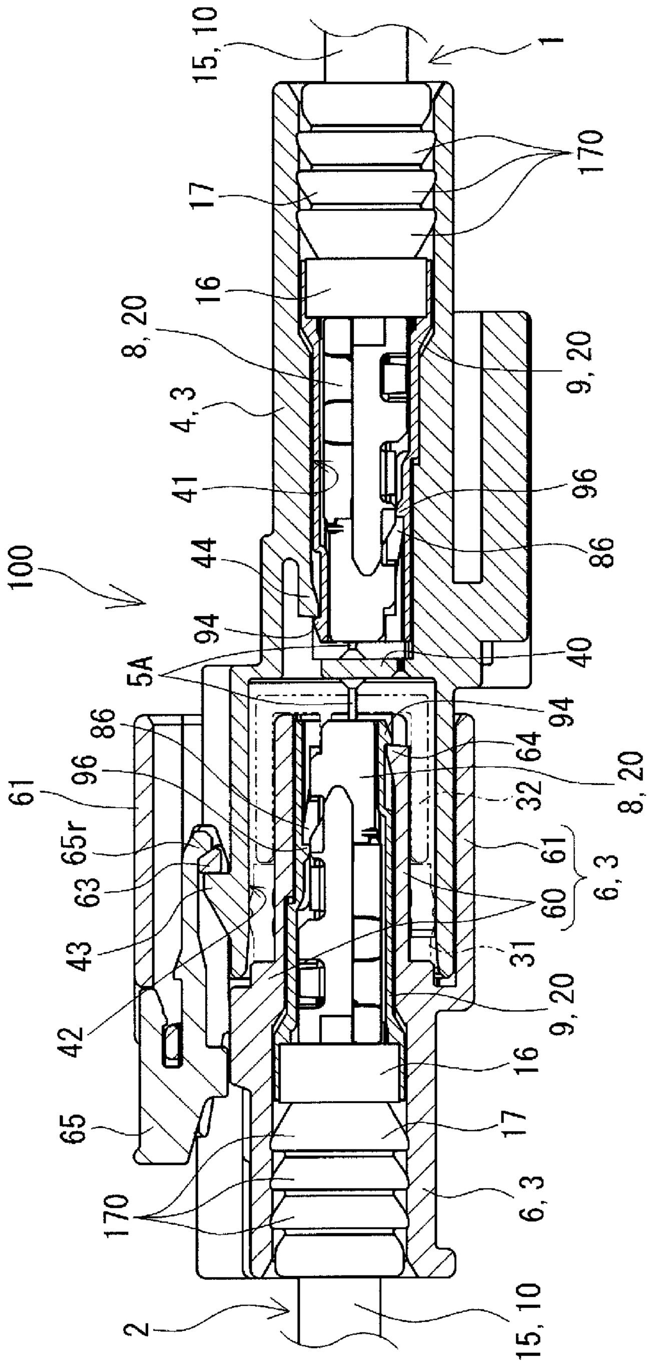
FIG. 3 is a longitudinal section of the cable connection structure of the embodiment.

In this example, a cable connection structure 100 used in wired high-speed communication in an automotive vehicle is described on the basis of FIGS. 1 to 12. As shown in FIGS. 1 to 3, the cable connection structure 100 is provided with a first communication cable 1, a second communication cable 2 and a relay member 3. The relay member 3 electrically connects the first and second communication cables 1, 2. Each component of the cable connection structure 100 is described in detail below.

<<First Communication Cable, Second Communication Cable>>

The first and second communication cables 1, 2 are preferably capable of securing a communication speed of 100 Mbps or faster. The communication speed is preferably 1 Gbps or faster.

Figure 7:
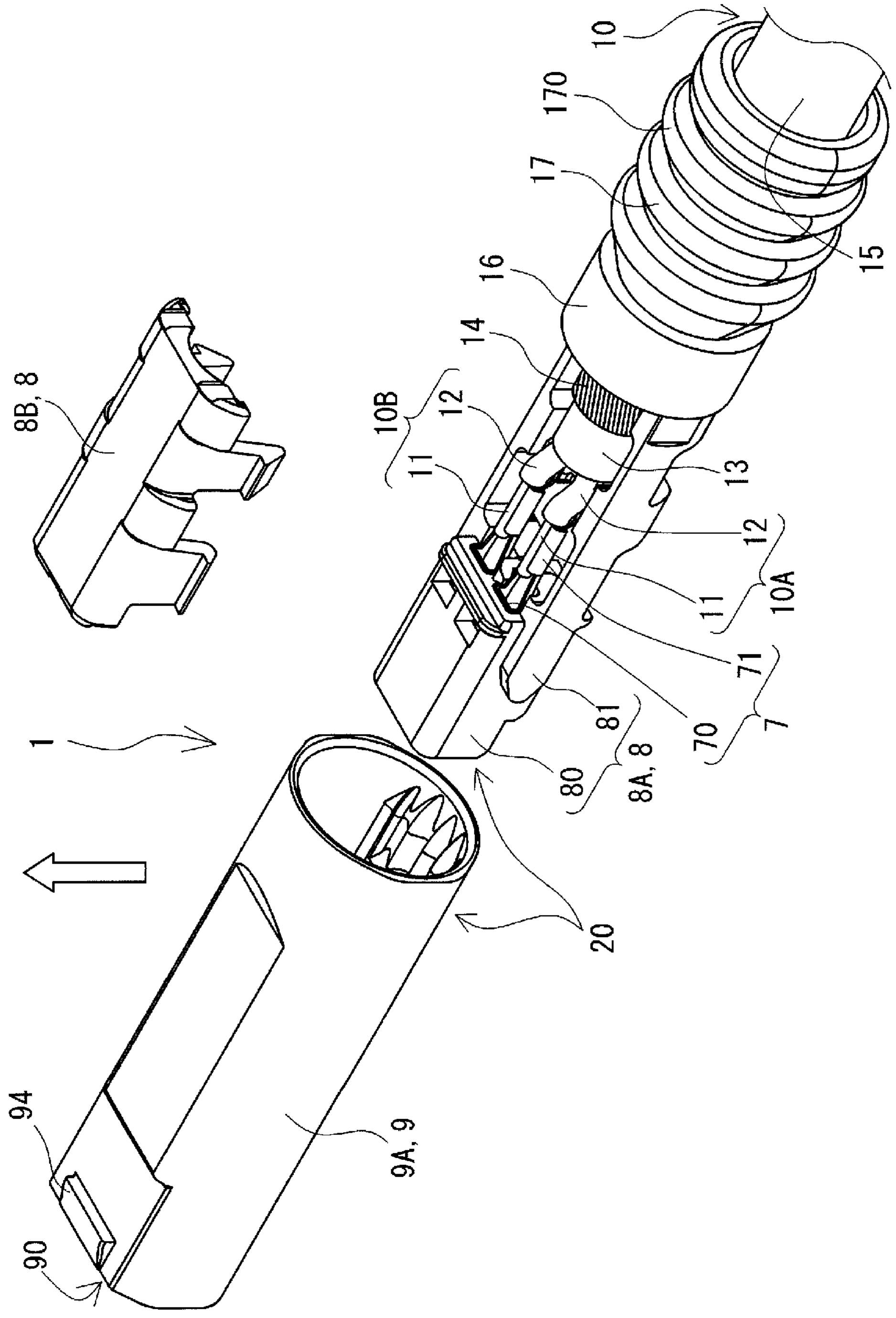
FIG. 7 is an exploded perspective view of a first communication cable provided in the cable connection structure of the embodiment.
Figure 8:
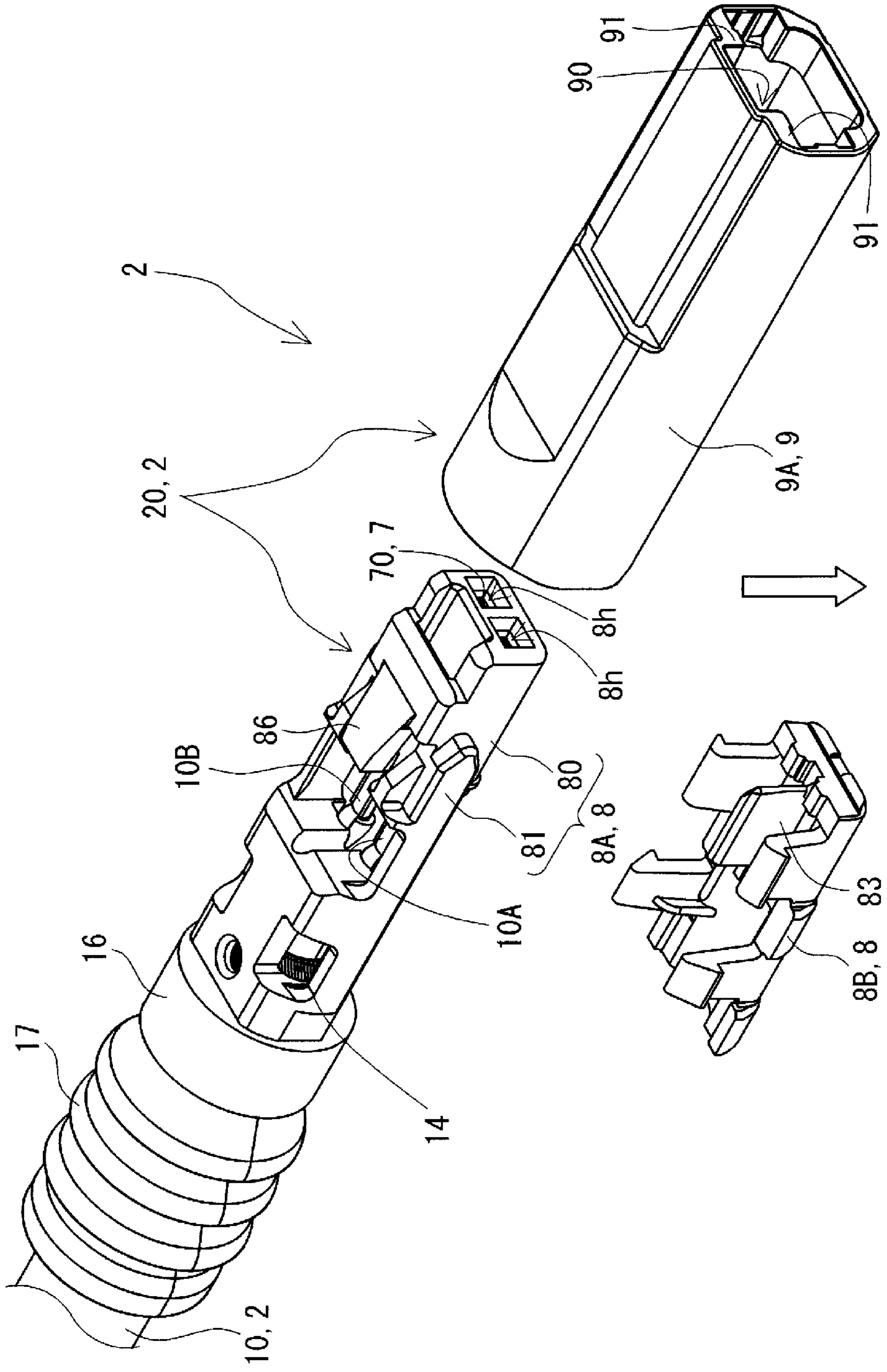
FIG. 8 is an exploded perspective view of a second communication cable provided in the cable connection structure of the embodiment.

Each of the first and second communication cables 1, 2 includes a cable body 10 and a connector module 20 provided on an end part of the cable body 10 as shown in FIGS. 2, 7 and 8. In this example, the cable bodies 10 of the both communication cables 1, 2 have the same configuration. The cable bodies 10 of the both communication cables 1, 2 may have different lengths. The connector modules 20 of the both communication cables 1, 2 also have the same configuration. Connector modules on the unillustrated other end parts of the both communication cables 1, 2 may be the same as or different from the connector modules 20.

Cable Body

The cable body 10 of this example is a twisted pair cable satisfying Ethernet (registered trademark) standards as shown in FIG. 7. The twisted pair cable is suitable for differential communication hardly affected by noise. The cable body 10, which is a twisted pair cable, includes two wires 10A, 10B twisted with each other. The wire 10A, 10B has a polarity. Accordingly, the wire 10A of the first communication cable 1 of FIG. 7 needs to be connected to the wire 10A of the second communication cable 2 of FIG. 8, and the wire 10B of the first communication cable 1 needs to be connected to the wire 10B of the second communication cable 2. In this example, as shown in FIG. 2, the connector module 20 of the first communication cable 1 and the connector module 20 of the second communication cable 2 are connected while being vertically inverted from each other. Thus, the same polarities of the both communication cables 1, 2 are connected to each other.

As shown in FIG. 7, the wire 10A, 10B includes a conductor 11 and a conductor insulating layer 12 covering the outer periphery of the conductor 11. The twisted two wires 10A, 10B are gathered into one by an intervening insulating layer 13. The conductor insulating layer 12 and the intervening insulating layer 13 function as insulating layers for ensuring the insulation of the conductor 11. The cable body 10 further includes a shielding layer 14 provided on the outer periphery of the intervening insulating layer 13 and a sheath 15 for covering the outer periphery of the shielding layer 14. The shielding layer 14 is configured to shield electromagnetic waves and, for example, constituted by a braided wire made of copper. On the other hand, the sheath 15 is configured to mechanically protect constituent members inside, and made of insulating resin such as polyvinyl chloride.

The end part of the cable body 10 is stripped. The wires 10A, 10B are exposed from the intervening insulating layer 13 on a tip side of the cable body 10, and the conductors 11 are exposed from the conductor insulating layers 12 at the tips of the wires 10A, 10B. Further, the shielding layer 14 is exposed from the sheath 15 at the end part of the cable body 10.

An electrically conductive rubber member 16 is arranged on the outer periphery of the shielding layer 14 exposed from the sheath 15. The electrically conductive rubber member 16 is a tubular body. The electrically conductive rubber member 16 is, for example, made of natural rubber or synthetic rubber blended with carbon black or metal powder. As shown in FIG. 3, the electrically conductive rubber member 16 is press-fit in a shield member 9. Therefore, the electrically conductive rubber member 16 is held in close contact with the outer periphery of the shielding layer 14 and the inner peripheral surface of the shield member 9. The electrically conductive rubber member 16 having an electrical conductivity electrically connects the shielding layer 14 and the shield member 9.

A tubular waterproof boot 17 is fit on the outer periphery of the sheath 15. The tip of the waterproof boot 17 is in contact with the electrically conductive rubber member 16. A plurality of annular lips 170 projecting radially outward are provided on the outer periphery of the waterproof boot 17. The plurality of lips 170 are arranged in a direction along an axial direction of the waterproof boot 17.

Connector Modules

The connector module 20 includes female terminals 7, a connector member 8 and a shield member 9. The connector module 20 provided on the tip of the communication cable 1, 2 is very small. For example, an axial length of the connector module 20 along an inserting direction of the connector module 20 is about 10 mm to 25 mm.

Here, for the convenience of description, a direction indicated by a white arrow in FIG. 7 is described as an upward direction of the connector module 20. As described with reference to FIG. 2, in the cable connection structure 100 of this example, the connector module 20 of the first communication cable 1 and the connector module 20 of the second communication cable 2 are connected via the relay member 3 while being vertically inverted from each other. Accordingly, in FIG. 8, a direction indicated by a white arrow is the upward direction of the connector module 20. As shown in FIG. 3, in the cable connection structure 100 of this example, an end part of the connector module 20 of the first communication cable 1 and an end part of the connector module 20 of the second communication cable 2 are butted against each other via a partitioning portion 40 of the relay member 3. The connector module 20 of the first communication cable 1 is rotated 180° with respect to the connector module 20 of the second communication cable 2 with an axis of the relay member 3 as an axis of rotation.

Female Terminals

The female terminal 7 includes, as shown in FIG. 7, a tubular connecting portion 70 and a wire barrel 71. In this example, a signal pin 5A (see FIGS. 5, 6, 10 and 11) is inserted into the connecting portion 70 of the female terminal 7. The wire barrel 71 grips the conductor 11 of the cable body 10. The female terminal 7 of this example is very small. For example, an axial length of the female terminal 7 is about 7 mm to 15 mm A hole diameter of the connecting portion 70 is about 1 mm or less.

The female terminal 7 is made of a material excellent in electrical conductivity. For example, copper or copper alloy can be cited as the material of the female terminal 7. Since the female terminal 7 of this example is very small in size, the female terminal 7 is required to have excellent strength. Stainless steel can be, for example, cited as the material of the female terminal 7 excellent in strength and electrical conductivity.

Connector Member

The connector member 8 accommodates the female terminals 7 inside. The connector member 8 of this example includes a body 8A and a cover 8B. In the connector member 8, the cover 8B is arranged on an upper side.

The body 8A holds the female terminals 7 to be connected to the conductors 11. The cover 8B covers connected locations of the wire barrels 71 of the female terminals 7 and the conductors 11 of the cable body 10. The body 8A and the cover 8B are both made of insulating resin such as polyethylene. A partition plate 83 is provided on the inner peripheral surface of the cover 8B of this example (FIG. 8). The partition plate 83 has a function of ensuring insulation between the wires 10A and 10B of FIG. 7 by being interposed between the wires 10A and 10B.

The body 8A of the connector member 8 includes a connector tube portion 80. As shown in FIG. 8, the connector tube portion 80 includes insertion holes 8*h*, into which the connecting portions 70 of the female terminals 7 are inserted. One female terminal 7 is inserted into the insertion hole 8*h*.

Two guide portions 81 are provided on both sides in a width direction on the outer periphery of the connector tube portion 80. The width direction of the connector tube portion 80 is a direction orthogonal to a vertical direction and a length direction of the connector member 8. The guide portion 81 has a tapered shape toward the front. Accordingly, the guide portion 81 is formed with an inclined surface facing upward of the connector member 8 and an inclined surface facing downward thereof. The tip of the guide portion 81 connecting the both inclined surfaces is rounded.

Shield Member

The shield member 9 is a tubular member for covering the outside of the connector member 8. The shield member 9 of this example includes one tubular portion 9A for individually accommodating the connector member 8. Unlike this example, the shield member 9 may be configured to include a plurality of coupled tubular portions 9A. An axial length of the shield member 9 of this example is longer than that of the connector member 8. An end surface on the tip side of the shield member 9 is substantially flush with an end surface on the tip side of the connector member 8. Therefore, the insertion holes 8*h* of the connector member 8 are exposed through an opening 90 on the tip side of the shield member 9.

The shield member 9 has a length extending from the tips of the female terminals 7 to the shielding layer 14 of the cable body 10. As shown in FIGS. 2 and 3, the shield member 9 is electrically connected to the shielding layer 14 (see FIG. 7) via the electrically conductive rubber member 16.

The shield member 9 is preferably a cast body. Casting enables the fabrication of the shield member 9 having no hole open in a peripheral surface. In a shield member formed by combining a first shell and a second shell formed of press-molded bodies as in patent literature 1, a hole is formed at a location where the both shells are engaged. Holes serving as paths of electromagnetic waves are not present in the peripheral surface of the shield member 9 of this example formed by the cast body. Thus, the shield member 9 of this example is excellent in shielding performance.

A material of the shield member 9 formed of the cast body is not particularly limited as long as the material is an alloy having a high electrical conductivity. For example, a zinc alloy excellent in electrical conductivity and strength is preferable as the material of the shield member 9. In high-speed communication of 100 Mbps, the shield member 9 made of zinc alloy is better in shielding performance for shielding electromagnetic waves than a shield member 9 made of aluminum alloy. Further, since the molten zinc alloy is low in viscosity, it easily spreads to narrow gaps of a mold. Therefore, by using the zinc alloy, the shield member 9 small in size and thin can be fabricated with good dimensional accuracy. The zinc alloy is preferable as the material of the shield member 9 also in being inexpensive.

Figure 9:
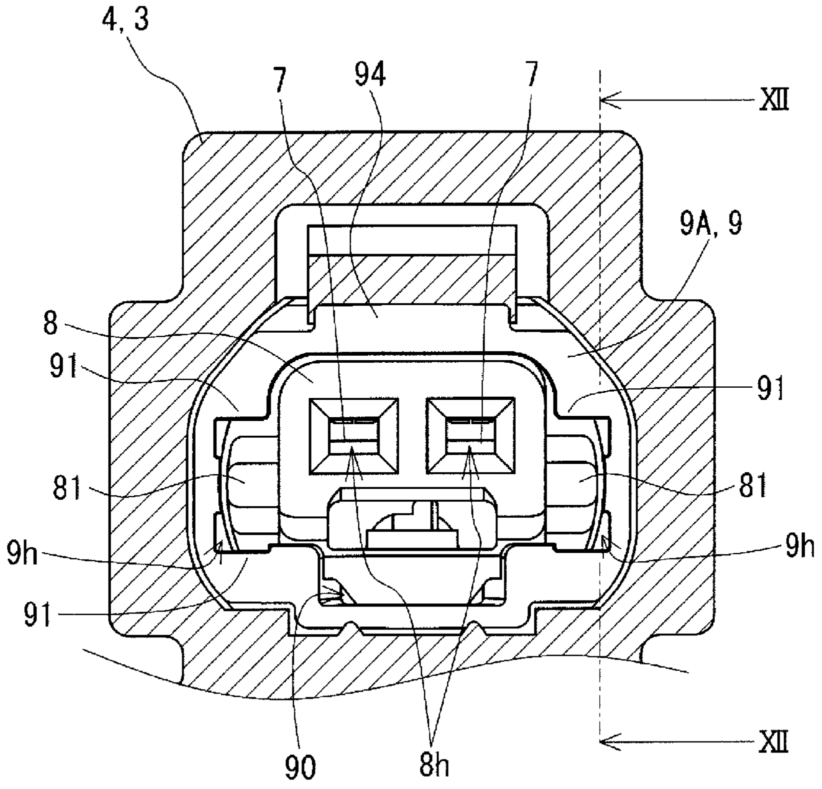
FIG. 9 is a transverse section of the cable connection structure of the embodiment cut at the position of an end surface of the first communication cable.

The opening 90 on the tip side of the shield member 9 is wider than the end surface of the connector member 8. The opening 90 is easily understood if the shield member 9 of the second communication cable 2 of FIG. 8 is referred to. FIG. 9 is a transverse section of the cable connection structure 100 cut at the position of the end surface of the connector module 20 of the first communication cable 1. In FIG. 9, the signal pins 5A and shield pins 5B of the relay member 3 are not shown. If the connector member 8 is fit into the shield member 9, gaps 9*h* are formed between the inner peripheral surface of the shield member 9 and the outer peripheral surface of the connector member 8 when viewed from the end surface side of the connector member 8 at the position of the opening 90. One gap 9*h* is formed on each of left and right sides of the connector member 8. If the gaps 9*h* are viewed from an axial direction of the shield member 9, the guide portions 81 of the connector member 8 are seen at the backs of the gaps 9*h*.

At a position corresponding to the gap 9*h*, a part of the inner peripheral surface of the shield member 9 protrudes to form a protruding portion 91. A projecting direction of the protruding portion 91 is a vertical direction of the shield member 9. This protruding portion 91 serves as an electrical contact point of the shield pin 5B and the shield member 9 as described later.

Miscellaneous

In each member constituting the connector module 20, a positioning portion for determining a relative position of each member is present. The positioning portions are described later.

<<Relay Member>>

Figure 4:
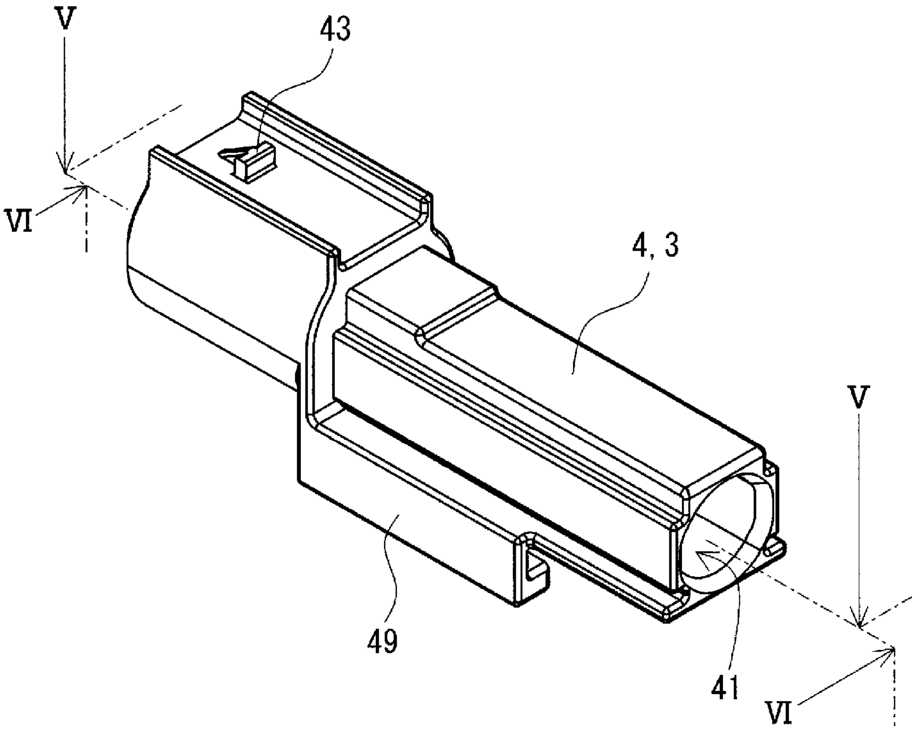
FIG. 4 is a perspective view of a first housing provided in the cable connection structure of the embodiment.
Figure 5:
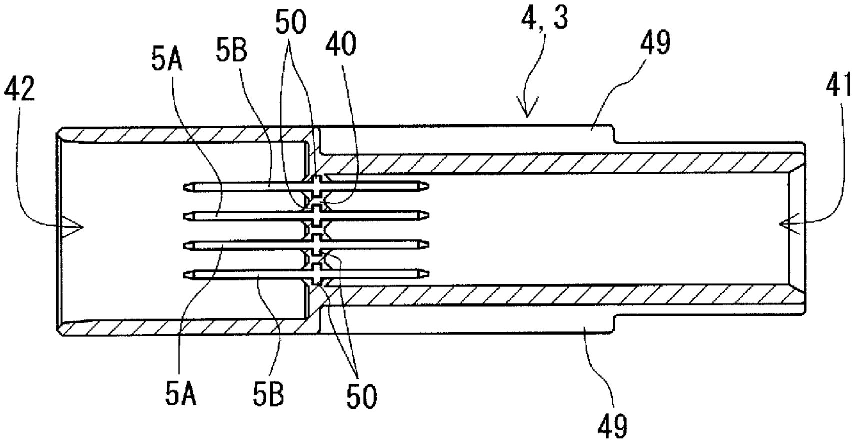
FIG. 5 is a section along V-V of FIG. 4.
Figure 6:
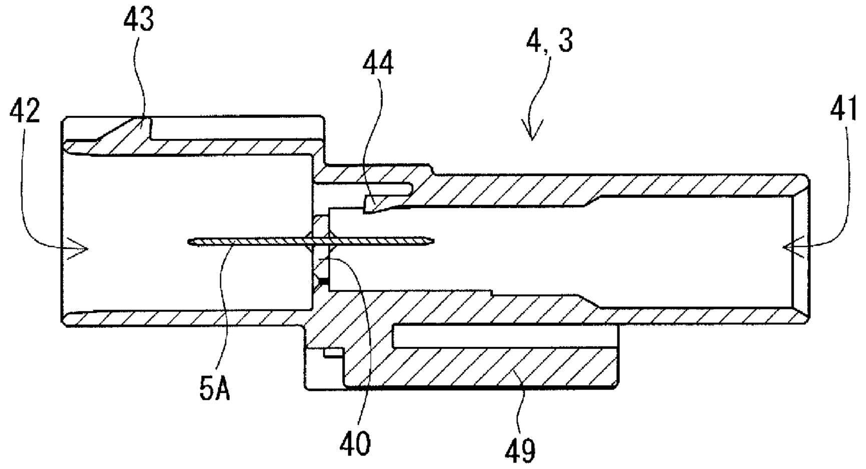
FIG. 6 is a section along VI-VI of FIG. 4.

As shown in FIGS. 4 to 6, the relay member 3 includes the signal pins 5A (FIGS. 5 and 6), the shield pins 5B (FIG. 5) and a first housing 4. The relay member 3 of this example further includes a second housing 6 (see FIGS. 1 to 3) separate from the first housing 4. The second housing 6 is not an essential constituent element.

Signal Pins and Shield Pins

The signal pin 5A is a member for electrically connecting the female terminal 7 provided in the first communication cable 1 and the female terminal 7 provided in the second communication cable 2. On the other hand, the shield pin 5B is a member for electrically connecting the shield member 9 provided in the first communication cable 1 and the shield member 9 provided in the second communication cable 2. A detailed arrangement of the pins 5A, 5B in the cable connection structure 100 is described in the section of an assembling procedure of the cable connection structure 100.

The signal pins 5A and the shield pins 5B are made of a material excellent in electrical conductivity. The signal pins 5A and the shield pins 5B may be made of the same material as the female terminals 7 or may be made of a material different from that of the female terminals 7. Further, the signal pins 5A and the shield pins 5B of this example have the same shape. Each of the both pins 5A, 5B is a bar-like body and includes a wide portion 50 in an intermediate part. The wide portion 50 is a location where the pin 5A, 5B is partially widened.

First Housing

As shown in FIGS. 5 and 6, the first housing 4 is a tubular member for integrating the signal pins 5A and the shield pins 5B. The first housing 4 includes the partitioning portion 40 in an intermediate part inside. Accordingly, an internal space of the first housing 4 is divided into a first hole portion 41 and a second hole portion 42 by the partitioning portion 40. The connector module 20 of the first communication cable 1 is fit into the first hole portion 41 (FIG. 2). The connector module 20 of the second communication cable 1 is fit into the second hole portion 41.

The signal pins 5A and the shield pins 5B described above are held in the partitioning portion 40. The partitioning portion 40 holds the wide portions 50 of the pins 5A, 5B. Accordingly, the pins 5A, 5B do not wobble. Further, the pins 5A, 5B project into both the first and second hole portions 41, 42. A thickness of the partitioning portion 40 is preferably 1 mm or more. If the thickness of the partitioning portion 40 is 1 mm or more, the pins 5A, 5B are firmly held by the partitioning portion 40.

In this example, two signal pins 5A and two shield pins 5B are arranged in a width direction of the connector module 20 as shown in FIG. 5. The shield pins 5B are arranged on outer sides in the width direction, and the two signal pins 5A are arranged at positions between the two shield pins 5B. The respective pins 5A, 5B are arranged not to contact each other. As shown in FIG. 6, the signal pins 5A and the shield pins 5B are aligned in height.

A mounting portion 49 is provided on the outer peripheral surface of the first housing 4. The mounting portion 49 is used to mount the first housing 4 on a mounting object. In the case of this example, the mounting object is a frame of a vehicle body or the like.

Second Housing

As shown in FIGS. 2 and 3, the second housing 6 includes a tubular housing body 60 and an outer tube portion 61. The outer tube portion 61 covers from an intermediate part to a tip part of the housing body 60 in an axial direction. As shown in FIG. 3, the connector module 20 of the second communication cable 2 is fit into the housing body 60. The tip of the first housing 4 is fit into a gap formed between the housing body 60 and the outer tube portion 61. Further, the tip of the housing body 60 is fit into the second hole portion 42 of the first housing 4. As a result, the connector module 20 of the second communication cable 2 fit inside the housing body 60 is also fit into the second hole portion 42.

A water stopper 31 and an auxiliary member 32 indicated by imaginary lines are provided between the inner peripheral surface of the first housing 4 fit between the housing body 60 and the outer tube portion 61 and the outer peripheral surface of the housing body 60. The water stopper 31 is a tubular member, for example, constituted by a resilient body made of rubber or the like. The water stopper 31 suppresses water intrusion into the connector module 20 of the second communication cable 2 through the gap between the first and second housings 4, 6. The auxiliary member 32 is a tubular member having a bottom part. The bottom part includes holes through which the signal pins 5A and the shield pins 5B are inserted. The auxiliary member 32 is used to prevent the detachment of the water stopper 31 and detect insufficient insertion of the connector module 20. Further, the auxiliary member 32 is used to push the water stopper 31 toward a back side of the outer tube portion 61. The water stopper 31 and the auxiliary member 32 may not be provided.

The second housing 6 includes a lock member 65 slidably mounted in the outer tube portion 61. A sliding direction of the lock member 65 is a direction along an axial direction of the second housing 6. The position of the lock member 65 in FIG. 2 is a position before being slid. The position of the lock member 65 in FIGS. 1 and 3 is a position after being slid.

<<Assembling Procedure>>

The cable connection structure 100 shown in FIGS. 1 and 3 is assembled according to the following procedures.

Procedure (1)

The first and second communication cables 1, 2 are prepared. Specifically, the electrically conductive rubber member 16, the waterproof boot 17 and the connector member 8 are mounted on the end part of the cable body 10. Subsequently, the shield member 9 is mounted on the connector member 8. As shown in FIG. 8, a cantilevered lock arm 86 is formed on the lower surface (surface on an upper side in FIG. 8) of the connector member 8. This lock arm 86 is engaged with a step 96 formed on the inner peripheral surface of the shield member 9 as shown in FIG. 3. As a result, the shield member 9 is not easily detached from the connector member 8.

The electrically conductive rubber member 16 of the communication cable 1, 2 is arranged inside the shield member 9. The electrically conductive rubber member 16 presses the inner peripheral surface of the shield member 9. Therefore, the shielding layer 14 (see FIG. 7) of the cable body 10 and the shield member 9 are electrically connected via the electrically conductive rubber member 16.

Procedure (2)

The connector module 20 of the first communication cable 1 is inserted into the first hole portion 41 of the first housing 4. As shown in FIG. 6, a cantilevered lock arm 44 is formed at a position near the partitioning portion 40 on the inner peripheral surface of the first hole portion 41. This lock arm 44 is engaged with a projection 94 formed on the outer peripheral surface of the shield member 9 as shown in FIG. 3. As a result, the first communication cable 1 hardly comes out from the first hole portion 41. As shown in FIG. 7, the projection 94 is provided on the upper surface of the shield member 9.

The waterproof boot 17 of the first communication cable 1 is arranged inside the first hole portion 41. The lips 170 of the waterproof boot 17 press the inner peripheral surface of the first hole portion 41. Therefore, water intrusion into the first hole portion 41 through an opening of the first hole portion 41 is suppressed.

Procedure (3)

The connector module 20 of the second communication cable 2 is inserted into the housing body 60 of the second housing 6. The connector module 20 is inserted through an opening on a side, where the outer tube portion 61 is absent, in the housing body 60. As shown in FIG. 2, a lower side of the tip of the housing body 60 is partially cut, and a projection 64 extending inward is provided on an end part of that cut part. As shown in FIG. 3, this projection 64 is engaged with a projection 94 of the shield member 9. As a result, the second communication cable 2 hardly comes out from the housing body 60.

The waterproof boot 17 of the second communication cable 2 is arranged inside the housing body 60. The lips 170 of the waterproof boot 17 press the inner peripheral surface of the housing body 60. Therefore, water intrusion into the housing body 60 through an opening on a cable insertion side in the housing body 60 is suppressed.

It does not matter which of the procedures (2) and (3) is performed first.

Procedure (4)

The housing body 60 of the second housing 6 is inserted into the second hole portion 42 of the first housing 4. As shown in FIG. 3, a beam-like portion 63 connecting the inner peripheral surface on the back side of the outer tube portion 61 in FIG. 3 and the inner peripheral surface (not shown) on a front side in FIG. 3 is provided between the housing body 60 and the outer tube portion 61 of the second housing 6. A projection 43 of the first housing 4 (see also FIGS. 2 and 4) is engaged with this beam-like portion 63. As a result, the first and second housings 4, 6 are hardly separated.

In this example, the lock member 65 shown in FIG. 2 is pushed toward the first housing 4 as shown in FIG. 1. As shown in FIG. 3, the lock member 65 includes a lock arm **65*r* extending between the housing body 60 and the outer tube portion 61. If the lock member 65 is slid, the tip of the lock arm 65*r* is caught by the beam-like portion 63. As a result, the first and second housings 4, 6** are more hardly separated.

Figure 10:
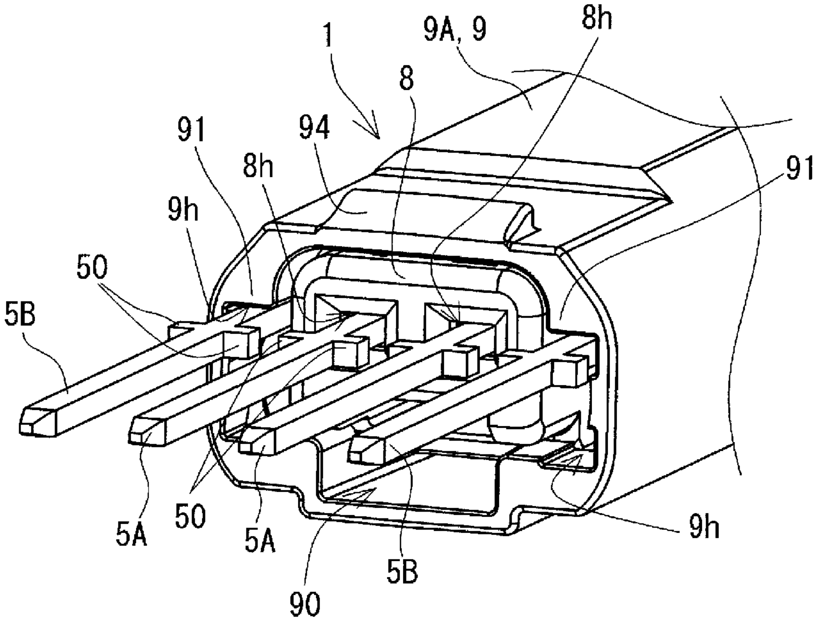
FIG. 10 is a schematic perspective view showing an arranged state of signal pins and shield pins with respect to the first communication cable of the embodiment.
Figure 11:
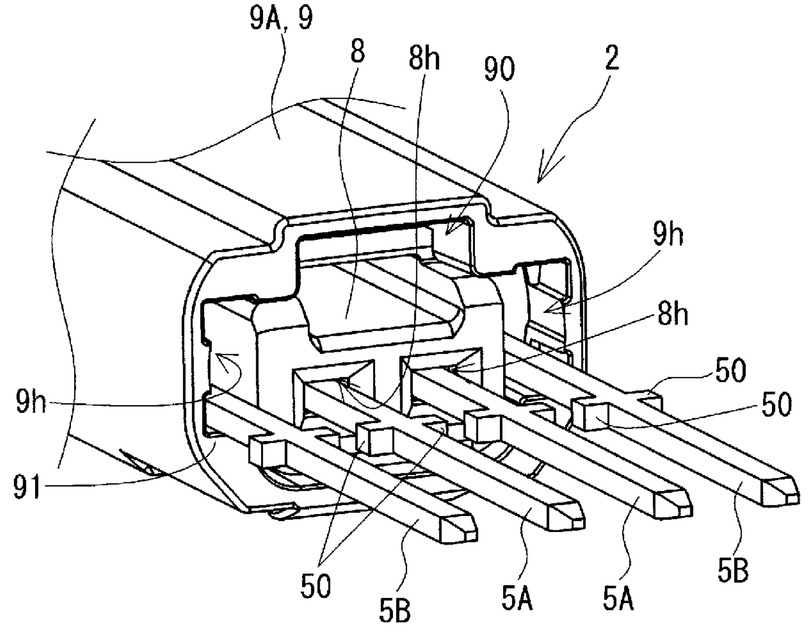
FIG. 11 is a schematic perspective view showing an arranged state of the signal pins and the shield pins with respect to the second communication cable of the embodiment.
Figure 12:
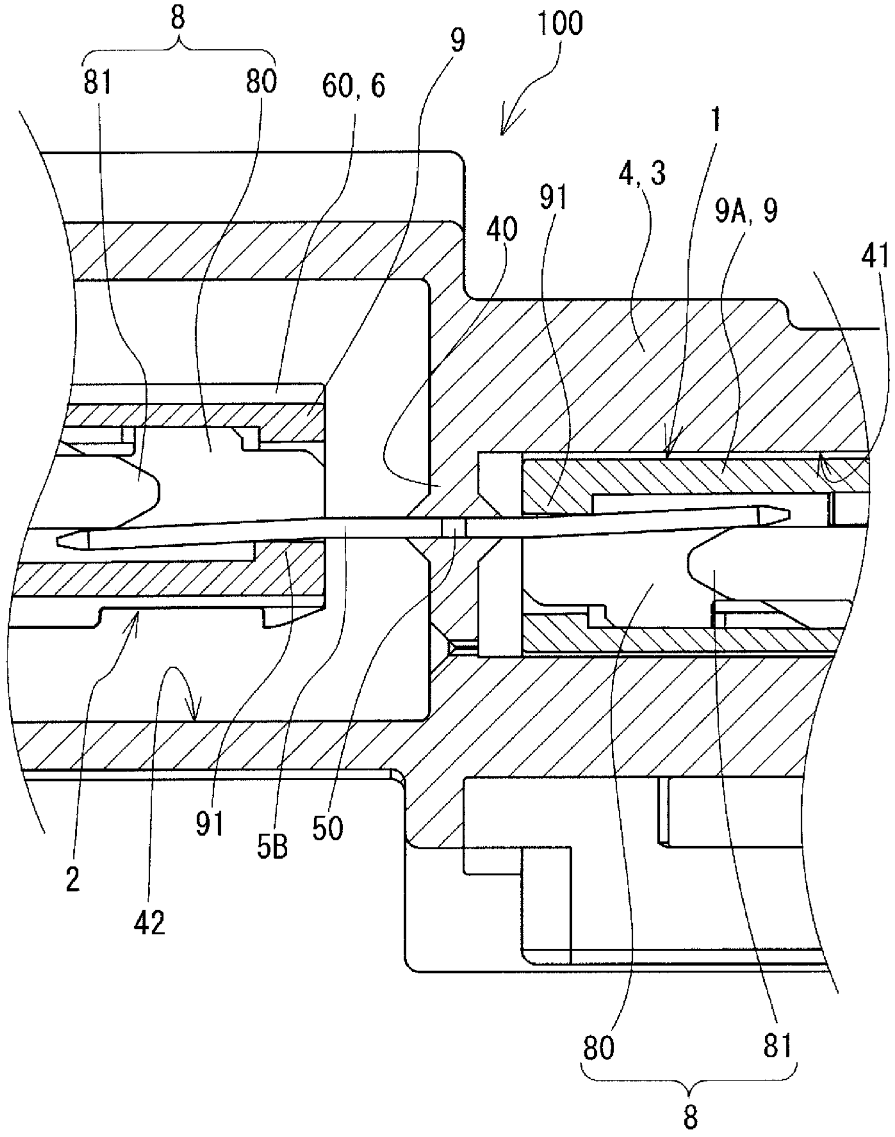
FIG. 12 is a longitudinal section of the cable connection structure of the embodiment cut along a cutting line XII-XII of FIG. 9.

The arrangement of the signal pins 5A and the shield pins 5B in the cable connection structure 100 constructed according to the above procedures is described on the basis of FIGS. 10 to 12. In FIGS. 10 and 11, only the signal pins 5A and the shield pins 5B, out of the relay member 3, are shown in addition to the communication cable 1, 2. FIG. 12 shows a longitudinal cross-section of the cable connection structure 100 cut at the position of a cutting line XII-XII in FIG. 9.

As shown in FIGS. 10 and 11, the signal pins 5A are inserted into the insertion holes **8*h* of the connector modules 8. The female terminals 7 (see FIGS. 8, 9 and the like) are arranged inside the insertion holes 8*h*. Therefore, the female terminals 7 of the first communication cable 1 and the female terminals 7 of the second communication cable 1** are electrically connected.

On the other hand, the shield pins 5B are inserted into the gaps **9*h* between the connector members 8 and the shield members 9. As shown in FIG. 12, the shield pin 5B inserted into the gap 9*h* is bent toward the inner peripheral surface of the shield member 9 by the guide portion 81 of the connector member 8. Specifically, a part to be arranged in the first hole portion 41, out of the shield pin 5B, is bent upward in FIG. 12. The bent shield pin 5B tries to return to a straight state due to the resiliency thereof. As a result, the shield pin 5B is strongly pressed against the protruding portion 91 of the shield member 9 in the first communication cable 1. Similarly, out of the shield pin 5B, a part to be arranged in the second hole portion 42 is bent downward in FIG. 12. The bent shield pin 5B is strongly pressed against the protruding portion 91 of the shield member 9 in the second communication cable 2. In this way, the shield members 9 of the both communication cables 1, 2 are brought into conduction with each other. As a result, a ground circuit for currents flowing in the shielding layers 14 (FIG. 7) is formed. If the shielding layers 14 are connected to ground in the unillustrated end parts of the communication cables 1, 2, the currents flowing in the shielding layers 14** are allowed to escape to ground.

In the configuration of this example, shielding between the end surface of the shield member 9 of the first communication cable 1 and the end surface of the shield member 9 of the second communication cable 2 is limited. However, in the configuration of this example, the end surfaces of the both shield members 9 can be arranged at very close positions. A distance between the both end surfaces is preferably 1 mm or more and 5 mm or less. This distance is more preferably 1 mm or more and 3 mm or less, even more preferably 1 mm or more and 2 mm or less. The above distance in this example is 3 mm. At a communication speed of about 1 Gbps or lower, such a non-shielding region hardly causes a reduction in communication quality.

<<Effects>>

In the cable connection structure 100 of this example, transmission paths of communication signals of the first and second communication cables 1, 2 and a ground circuit for allowing the currents flowing in the shielding layers 14 to escape to ground are simultaneously secured only by inserting the first and second communication cables 1, 2 into the relay member 3. Therefore, the first and second communication cables 1, 2 are easily connected.

The first and second communication cables 1, 2 of this example are twisted pair cables having polarities. In this example, the first and second communication cables 1, 2 are inserted into the relay member 3 while being vertically inverted from each other. Thus, even if the signal pins 5A are straight, the same polarities of the first and second communication cables 1, 2 are connected.

In this example, the connector module 20 of the first communication cable 1 and the connector module 20 of the second communication cable 2 have the same configuration. Therefore, it is not necessary to prepare a plurality of types of the connector modules 20.

In this example, the signal pins 5A and the shield pins 5B are integrally formed to the first housing 4. Therefore, the configuration of this example is excellent in productivity as compared to a configuration in which the first housing 4 and the pins 5A, 5B are individually fabricated and combined.

In this example, as shown in FIGS. 10 and 11, the female terminals 7 and the signal pins 5A are joined inside the connector member 8 and the shield member 9 and the shield pins 5B are connected outside the connector member 8. Thus, a connection error such as the connection of the signal pins 5A to the shield member 9 or the connection of the shield pins 5B to the female terminals 7 does not occur. Further, since the connector member 8 is interposed between the signal pins 5A and the shield pins 5B, insulation between the both pins 5A, 5B is ensured.

Other Embodiments

Unlike the above embodiment, the relay member 3 may be configured to be able to connect a plurality of the first communication cables 1 and a plurality of the second communication cables 2. In that case, the relay member 3 includes a plurality of the first hole portions 41 and a plurality of the second hole portions 42.

Unlike the above embodiment, the relay member 3 may not include the second housing 6. In such a configuration, an axial length of the second hole portion 42 of the first housing 4 is almost the same as that of the first hole portion 41. Further, a positioning portion for positioning the shield member 9 of the second communication cable 2 is provided on the inner peripheral surface of the first hole portion 41.

LIST OF REFERENCE NUMERALS

100 cable connection structure
1 first communication cable
2 second communication cable
10 cable body, 10A, 10B wire
11 conductor, 12 conductor insulating layer, 13 intervening insulating layer, 14 shielding layer, 15 sheath
16 electrically conductive rubber member, 17 waterproof boot, 170 lip
20 connector module
3 relay member
31 water stopper, 32 auxiliary member
4 first housing
40 partitioning portion, 41 first hole portion, 42 second hole portion, 43 projection
44 lock arm, 49 mounting portion
5A signal pin, 5B shield pin, 50 wide portion
6 second housing
60 housing body, 61 outer tube portion, 63 beam-like portion, 64 projection
65 lock member, 65*r* lock arm
7 female terminal
70 connecting portion, 71 wire barrel
8 connector member
8A body, 8B cover, 8*h* insertion hole
80 connector tube portion, 81 guide portion, 83 partition plate, 86 lock arm
9 shield member
9A tubular portion, 9*h* gap
90 opening, 91 protruding portion, 94 projection, 96 step

What is claimed is:

1. A cable connection structure, comprising:
a first communication cable;
a second communication cable; and
a relay member for electrically connecting the first and second communication cables, each of the first and second communication cables including:
a cable body; and
a connector module provided on an end part of the cable body,
the cable body including a conductor, an insulating layer arranged on an outer periphery of the conductor, a shielding layer arranged on an outer periphery of the insulating layer and a sheath for covering an outer periphery of the shielding layer,
the connector module including a female terminal to be electrically connected to the conductor, a connector member for accommodating the female terminal and a tubular shield member for covering an outer periphery of the connector member,
the shielding layer exposed from the sheath at an end part of the cable body being electrically connected to the shield member,
the relay member including:
a signal pin for electrically connecting the female terminal provided in the first communication cable and the female terminal provided in the second communication cable;
a shield pin for electrically connecting the shield member provided in the first communication cable and the shield member provided in the second communication cable; and
a tubular first housing for integrating the signal pin and the shield pin,
the first housing including a first hole portion, the connector module provided in the first communication cable being fit into the first hole portion, a second hole portion, the connector module provided in the second communication cable being fit into the second hole portion, and a partitioning portion for partitioning between the first and the second hole portions, and
the signal pin and the shield pin being held in the partitioning portion.

2. The cable connection structure according to claim 1, wherein the shield member is a cast body having no hole open in a peripheral surface thereof and includes a tubular portion for individually accommodating the connector member.

3. The cable connection structure according to claim 1, wherein:
the cable body is a twisted pair cable, and
the second communication cable is fit into the second hole portion in a state vertically inverted with respect to the first communication cable.

4. The cable connection structure according to claim 1, wherein:
each of the first and second communication cables includes a waterproof boot, and the waterproof boot is fit on an outer periphery of the sheath.

5. The cable connection structure according to claim 1, wherein:
the relay member includes a second housing separate from the first housing,
the second housing includes a tubular housing body, the connector module of the second communication cable being fit into the housing body, and an outer tube portion for covering an outer periphery of the housing body,
the first housing is fit between the housing body and the outer tube portion, and
the housing body is fit into the second hole portion of the first housing.

6. The cable connection structure according to claim 1, wherein a distance between an end surface of the shield member provided in the first communication cable and an end surface of the shield member provided in the second communication cable is 1 mm or more and 5 mm or less.

7. The cable connection structure according to claim 1, comprising a gap formed between an inner peripheral surface of the shield member and an outer peripheral surface of the connector member, wherein:

the shield pin is inserted into the gap and in contact with the inner peripheral surface of the shield member.

8. The cable connection structure according to claim 7, wherein:

the connector member includes a connector tube portion having an insertion hole, the female terminal being inserted into the insertion hole, and a guide portion protruding on an outer periphery of the connector tube portion, and the guide portion curves the shield pin inserted into the gap toward the shield member.

* * * * *